April 25, 1933.                H. WEICHSEL                1,905,773
                             SINGLE PHASE MOTOR
                             Filed May 14, 1931

Inventor
HANS WEICHSEL
By E.G. Huffman
Att'y.

Patented Apr. 25, 1933

1,905,773

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

SINGLE PHASE MOTOR

Application filed May 14, 1931. Serial No. 537,355.

My invention relates to single phase motors of the repulsion-induction type and its object is to improve the starting performance of such machines by providing means whereby the torque has a higher value at the time of short-circuiting the rotor, thus making it possible for the machine to accelerate to synchronous speed under higher loads.

Figure 1:
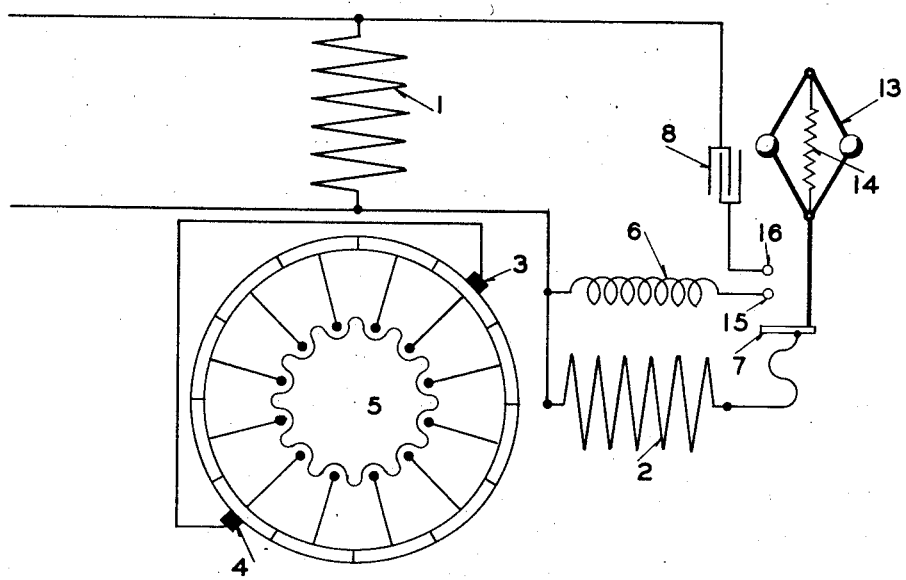
Figure 2:
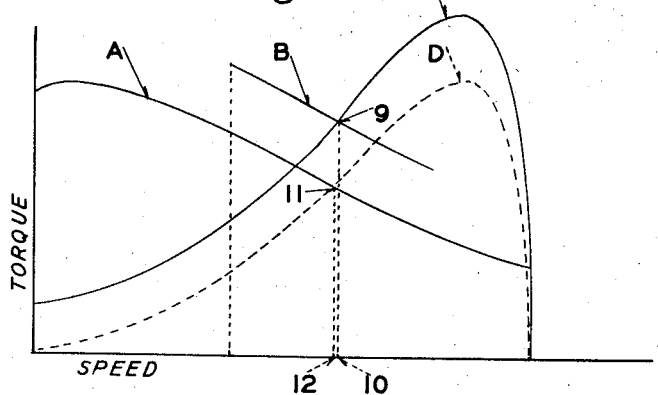

In the accompanying drawing Figure 1 diagrammatically illustrates a motor embodying my invention; and Figure 2 is a speed torque diagram.

Referring to Figure 1, the motor is provided with a main inducing winding 1 and with an auxiliary winding 2 displaced therefrom by preferably 90 electrical degrees. The induced winding is provided with a commuted winding which at starting is, by means of short-circuited brushes 3—4, closed along an axis displaced from the axis of the main inducing winding 1. The rotor is also provided with centrifugally operated short-circuiting mechanism, diagrammatically indicated at 5, for short-circuiting the commuted winding along a plurality of axes when a predetermined speed has been attained.

In order to improve the "pull-in" torque of this machine I provide a choke coil 6 which, by means of the centrifugally operated switch 7, is adapted to be connected in shunt with the auxiliary winding 2 when the motor has reached a speed somewhat below the speed at which the short-circuiting mechanism 5 is designed to operate. If the auxiliary winding 2 were connected in circuit with the choke coil 6 at starting, the torque of the machine would be reduced but after the motor has started and over the greater part of the acceleration range, the effect of the auxiliary winding 2, connected over the choke coil 6, is to increase the torque.

Referring to Figure 2, the curve "A" represents the torque of the machine as a repulsion motor; curve "B" the torque when operating as a repulsion motor with the addition of the auxiliary winding 2 connected over the choke coil; curve "C" represents the speed torque curve of an induction motor provided with a split phase circuit, (for example, the auxiliary winding 2 connected in series with the condenser and to the line in parallel with the main inducing winding); and curve "D" represents the speed torque curve of a straight single phase induction motor. Curve "C" is illustrated in this design for the reason that I prefer to connect the auxiliary winding through condenser 8 to the line in parallel with the main inducing winding for normal operation of the machine, making this connection at the time the rotor is short-circuited by means of the short-circuiting mechanism 5.

Since the short-circuiting mechanism should be set to operate at the time when the repulsion motor torque of the machine equals the torque the machine will have after the operation of the short-circuiting mechanism, it will be observed that the torque effective at change-over in my improved machine, and represented by the line 9—10, is greater than the torque represented by the line 11—12 which would exist at the change-over point if the auxiliary winding—choke coil—circuit were not provided. Consequently, the machine will be able to accelerate a greater load to normal operating speed.

The choke coil should not be left in circuit during the operation of the motor and the necessary switching can, for example, be accomplished by means of a centrifugal mechanism comprising centrifugal governor 13 operating against a compression spring 14 and first actuating the contact 7 into engagement with contact point 15, thereby connecting the choke coil in circuit with the auxiliary winding and later, when a higher speed has been attained—preferably the speed at which the short-circuiting mechanism 5 operates—bringing the contact 7 into engagement with contact point 16, thereby opening the choke coil circuit and connecting the auxiliary winding in series with the condenser and to the line in parallel with the main inducing winding.

Having fully described my invention, what I claim as new and desire to secure by Letters Patent of the United States is:

1. In a single phase motor, the combination of an induced member provided with a commuted winding, an inducing member having a main inducing winding and an auxiliary winding displaced therefrom, an inductance, means closing the commuted winding along an axis displaced from the main inducing winding, speed controlled means for short-circuiting the commuted winding along a plurality of axes when a selected sub-synchronous speed has been attained, and means for connecting the auxiliary winding in circuit with the inductance at a speed lower than said last named speed.

2. In a single phase motor, the combination of an induced member provided with a commuted winding, an inducing member having a main inducing winding and an auxiliary winding displaced therefrom, an inductance in circuit with the auxiliary winding, means closing the commuted winding along an axis displaced from the main inducing winding, speed controlled means for short-circuiting the commuted winding along a plurality of axes when a selected sub-synchronous speed has been attained, and means for rendering the inductance inoperative at normal operating speeds of the machine.

In testimony whereof, I hereunto affix my signature, this 8th day of May, 1931.

HANS WEICHSEL.